INVENTOR.
JOSEPH E. McATEER,
BY Robert H. Himes
ATTORNEY

Oct. 11, 1966 J. E. McATEER 3,278,905

ASSOCIATIVE MEMORY

Filed Dec. 3, 1962 3 Sheets-Sheet 2

INVENTOR
JOSEPH E. McATEER,
BY
Robert H. Himes
ATTORNEY.

SENSING APPARATUS

INTERROGATION OF STORED "ONE"

INVENTOR.
JOSEPH E. McATEER,
BY
Robert H. Hines
ATTORNEY

United States Patent Office 3,278,905

Patented Oct. 11, 1966

3,278,905

ASSOCIATIVE MEMORY

Joseph E. McAteer, Anaheim, Calif., assignor to Hughes Aircraft Company, Culver City, Calif., a corporation of Delaware Filed Dec. 3, 1962, Ser. No. 241,988

4 Claims. (Cl. 340—172.5)

This invention relates to an associative or content-addressed search memory for use in conjunction with digital computer apparatus and, more particularly, to an associative memory employing biaxial ferrite storage elements operated in a manner to achieve enhanced signal-to-no signal ratio.

Conventional types of memory elements generally considered for use in associative memory devices operating in the nondestructive mode include transfluxors, toroidal cores and thin films. In particular, the transfluxor is characteristically relatively slow in operation, possesses what is considered to be a poor signal-no signal ratio, requires large drive currents, and is comparatively expensive. On the other hand, toroidal cores, although fast, are characterized by a poor signal-no signal ratio and high current drive requirements. In addition, operation of toroidal cores in the nondestructive read-out mode of operation has not been demonstrated in large systems because of fundamental problems in element uniformity.

Further, the thin film element contemplated above refers to a "bicore element," i.e., a two-spot arrangement wherein one spot is of high coercive material and the remaining spot is of low coercive material. In this case, nondestructive readout is obtained by switching the low coercive spot and utilizing the field of the high coercive spot to provide reset. Thin film elements are, therefore, characterized by relatively low speed, high current drive requirements together with a low signal output. Alternate thin film arrangements which obtain nondestructive readout by employing a rotational mode of operation thereby offering higher speed have been proposed but have not been demonstrated as feasible in large systems.

It is therefore an object of the present invention to provide an improved associate memory apparatus.

Another object of the present invention is to provide an associative memory apparatus including biaxial memory elements having a new mode of operation.

Still another object of the present invention is to provide an associative memory apparatus employing biaxial memory elements in a manner to achieve very high speed, a good signal-no signal ratio, comparatively high output signal with moderate drive, and very low power dissipation.

A further object of the present invention is to provide associative memory apparatus of sufficient uniformity in operation to enable the large systems to be produced.

According to the present invention, an associative memory employing biaxial memory elements which operate in a manner to achieve high speed and an extremely favorable signal-no signal ratio is provided. In particular, a signal-no signal mode of operation is used rather than the more conventional bipolar signal mode. In writing into the array of storage elements, a 1 is first written into each element of the portion of the array switched to for storing a particular word. Subsequently, ones are changed to zeros in selected bits of this portion of the array as determined by the normal and the complement of the information to be stored.

This change to a 0 is accomplished by cancelling the components of flux orthogonal to the interrogation flux in the common volume of ferrite material intermediate the biaxial holes. Thus, in the latter case, upon interrogation of an element so written, no signal appears at the "sense" output in that there are no flux lines linking the sense line. The memory array is devised so that both the principal or normal of a particular number together with the complement are stored in the array. Upon subsequent search, however, the entire number is compared by interrogating only the zeros of the normal and the zeros of the complement. The determination of whether the normal or complement is interrogated at each element position is determined by the information being searched for at that element position. Accordingly, if upon interrogation, no signal appears or is generated on the sense line of a particular word in the array, this is an indication that the word stored matches the word which has been used to determine whether the normal or complement element at each position is to be searched. Lastly, an action bit is employed on the sense line of each word in the array. At the time the array is cleared, a 1 is written into each action bit (which generates a signal upon interrogation). This 1 is changed to a 0 upon writing into the portion of the array corresponding to the respective action bit. In this manner, portions of the array which are not being utilized for storage will not generate erroneous indications of a match upon interrogation.

The above-mentioned and other features and objects of this invention and the manner of obtaining them will become more apparent by reference to the following description taken in conjunction with the accompanying drawings, wherein.

Figure 1:
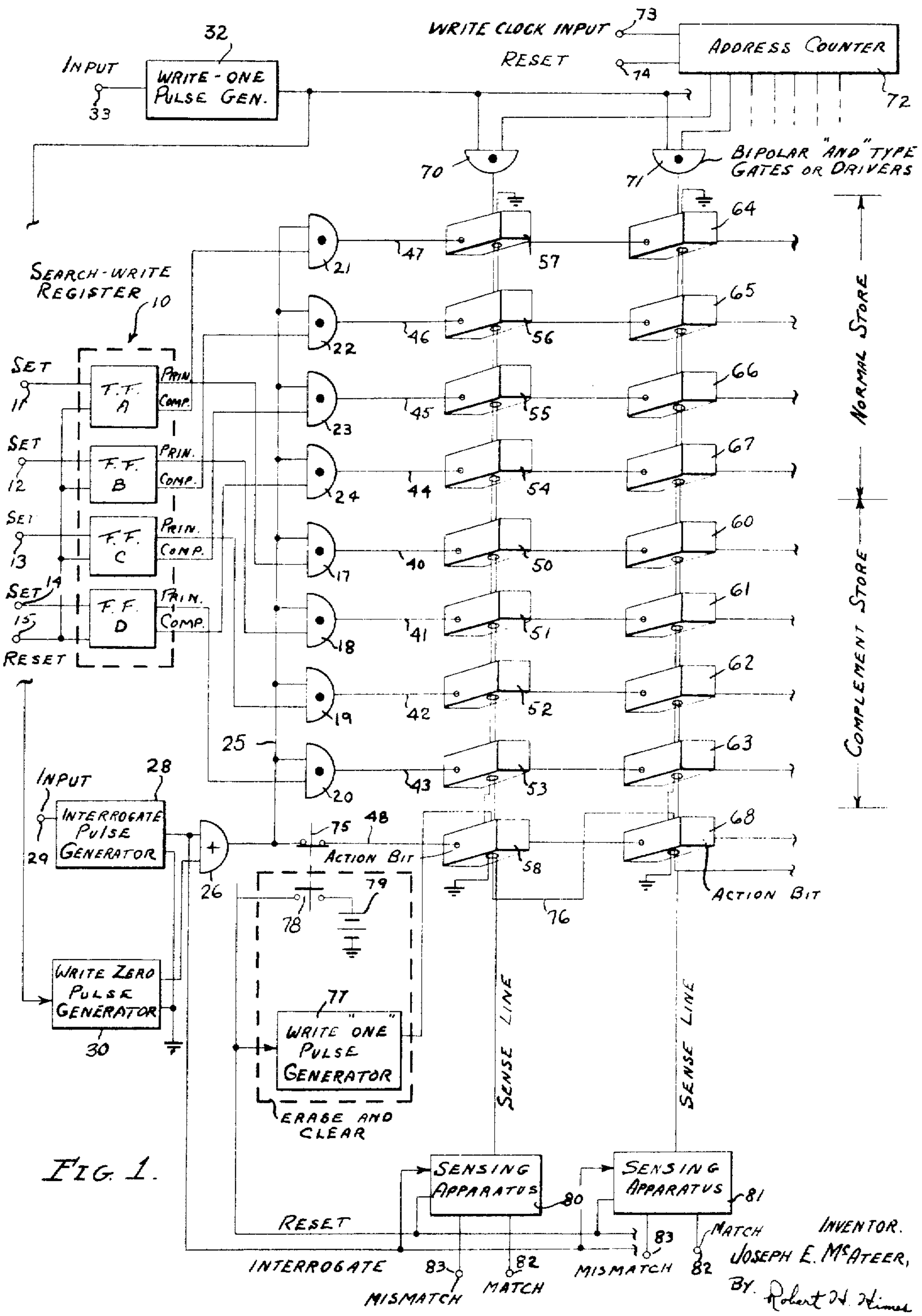
FIG. 1 is a schematic block diagram of an embodiment of an associative array illustrating the present invention.

In describing the apparatus of the present invention, a convention is employed wherein individual "and" and "or" gates are shown as semicircular blocks with the inputs applied to the straight side and the output appearing on the semicircular side. An and gate is indicated by a (·) and an or gate by a (+) in the semicircular block. In the present case, an and gate produces a 1 or information level output signal when every input differs from the 0 level and an or gate produces a 1 or information level output signal when a single input differs from the 0 level.

Also, in addition to the above, a convention is employed in describing the particular embodiment of the present invention wherein the upper and lower inputs to the flip-flops, as they appear in the drawing, are designated as the "set" and "reset" inputs, respectively. An information level signal applied to either the set or reset inputs of a flip-flop will change its state in a manner such that an information level signal appears at the corresponding principal or complementary output terminals, respectively. Further, if information level signals are applied to both the set and reset inputs of a flip-flop, the state of the flip-flop will change in accordance with the last signal applied.

Referring now to FIG. 1 of the drawings, there is shown a representative embodiment of the present invention that is adapted to store and search by way of example words containing four bits. In an actual embodiment, it is expected that apparatus adapted to store and search words containing significantly larger numbers of bits will be employed. The apparatus includes a search-write register 10 including flip-flops A, B, C and D for providing both a principal and complementary output for the word being written or searched. The flips-flops A, B, C and D have set input terminals 11, 12, 13 and 14, respectively, and a common rest input 15.

The principal outputs of the flip-flops A, B, C and D are connected, respectively, to one input of two-input and gates 17, 18, 19 and 20. The remaining complementary outputs of the flip-flops A, B, C and D are, on the other hand, connected, respectively, to one input of two-input and gates 21, 22, 23 and 24. The remaining inputs of the and gates 17–24 are connected to a common lead 25 which is connected to the output of a two-input or gate 26. One input of or gate 26 is responsive to interrogate pulses generated by an interrogate pulse generator 28 in response to synchronizing signals applied at an input terminal 29. In that numerous systems may be used to synchronize interrogate pulse signals, a specific means of synchronizing the interrogate pulse generator 28 has not been shown. In addition, the second input of two-input or gate 26 is responsive to "write-zero" pulses generated by a write-zero pulse generator 30 in response to the output signal from a write-one generator 32 in a manner hereinafter described. Write-one pulse generator 32 is, in turn, synchronized by means of signals applied at an input terminal 33. Since the actual initiation of write-one synchronizing signals depends upon a particular mode of operation, no specific means of synchronizing is shown or described. Manual operation may, for example, be used.

Figure 2:
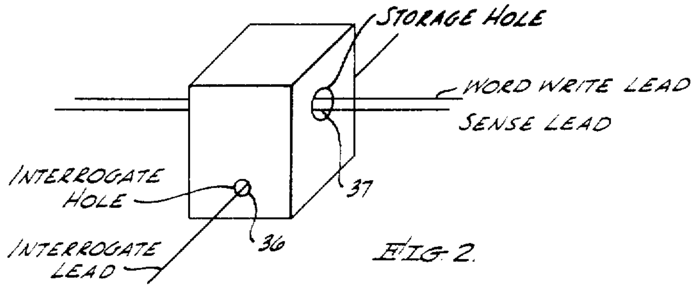
FIG. 2 is a perspective view of a biaxial ferrite storage element of the type used in the apparatus of FIG. 1.

Referring now to FIG. 2, there is shown a biaxial ferrite storage element of the type which is employed to provide the memory array in the apparatus of FIG. 1. Each storage element constitutes a square ferrite bar of a saturable magnetic characteristic having an interrogate hole 36 and a storage hole 37 disposed transversely therethrough and normal to each other with a portion of the ferrite bar approximately equal in length to the diameter of the storage hole 37 disposed therebetween. The interrogate hole 36 is of sufficient diameter to accommodate an "interrogate" lead and the storage hole 37 is of a diameter to accommodate both a word-write lead and a sense lead.

Returning to FIG. 1, interrogate leads 40, 41, 42, 43, 44, 45, 46 and 47 are connected, respectively, to the outputs of the and gates 17–24 and thread the interrogate holes 36 of a linear array of biaxial storage elements 50, 51, 52, 53, 54, 55, 56 and 57, respectively. Biaxial storage elements 54–57 are adapted to store the normal state of the bits of a 4-bit word No. 1 and storage elements 50, 51, 52 and 53 are adapted to store the complementary state of the bits of the word No. 1. Similarly, interrogate leads 40–47 thread the interrogate holes 36 of a linear array of biaxial storage elements 60–67, respectively. Biaxial storage elements 64–67 are adapted to store the normal state of the bits of a 4-bit word No. 2, and storage elements 60–63 are adapted to store the complementary state of the bits of word No. 2. In a like manner, the interrogate leads thread the respective biaxial storage elements of additional linear arrays, not shown, for providing additional storage.

Each of the linear arrays of biaxial storage elements 50–57 and 60–67 have associated bipolar and type gates or drivers 70, 71, respectively. The drivers 70, 71 function in the same manner as a conventional and gate with the exception that a signal appears at the respective outputs thereof when all signals applied to the inputs differ from the zero level irrespective of the polarity. The outputs from drivers 70, 71 constitute word-write leads and are threaded through the storage holes 37 of the storage elements 50–57 and 60–67, respectively, and returned to ground. The drivers 70, 71 are responsive to the output of the write-one pulse generator 32 and, in addition, are responsive to discrete outputs from an address counter 72. The address counter 72 is, in turn, responsive to write-clock pulses applied to an input terminal 73 and is reset in response to pulses applied to a reset terminal 74. The sources of the write-clock pulses and the reset pulses are not shown.

An action bit storage element is provided at the end of each array of storage elements 50–57 and 60–67 by disposing a storage element 58 at one extremity of the array of storage elements 50–57 and a storage element 68 at one extremity of the linear array of storage elements 60–67. An interrogate lead 48 is threaded through each of the interrogate holes 36 of the storage elements 58, 68 and is connected through a normally closed switch 75 to the output lead 25 of the or gate 26. As previously specified, the or gate 26 has inputs responsive to the outputs of the interrogate pulse generator 28 and the write-zero pulse generator 30. In addition, the storage holes 37 of the storage elements 58, 68 are threaded with a lead 76 which is driven from the output of a write-one pulse generator 77. Generation of write-one pulses by the write-one pulse generator 77 are initiated manually by means of a connection from the input thereof through a normally open switch 78 to the positive terminal of a battery 79, the negative terminal of which is referenced to ground. The normally closed switch 75 and the normally open switch 78 may be mechanically linked together if desired. In addition, each linear array of storage elements has a concomitant sensing apparatus 80, 81. Each of the sensing apparatuses 80, 81 include a sense line input which threads the storage holes 37 of the associated storage elements 50–58, 60–68, respectively, and are then returned to ground. The sensing apparatuses 80, 81 each include match and mismatch terminals 82, 83, respectively, for the purpose of indicating whether or not a word stored in its associated array of storage elements matches the word being searched which is "set up" in the search-write register 10 in a manner which will be hereinafter described. The output voltage indications appearing on the terminals 82, 83 of the sensing apparatuses 80, 81 may be reset to the mismatched state in response to a voltage applied through the normally open switch 78. Also, the sensing apparatuses 80, 81 operate in response to interrogate pulses generated by the interrogate pulse generator 28 by means of appropriate connections to the respective outputs thereof.

Figure 6:
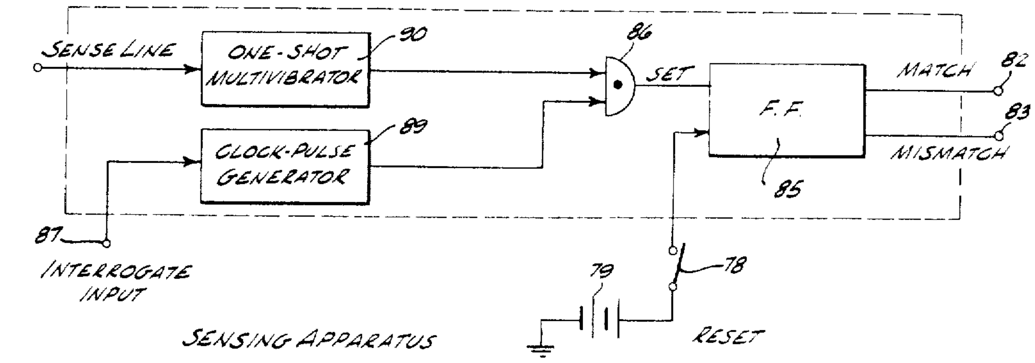
FIG. 6 shows a schematic block diagram of the sensing apparatus of FIG. 1.

Referring now to FIG. 6, there is shown an embodiment of the sensing apparatuses 80 and 81. The sensing apparatus includes, for example, a flip-flop 85 having a principal output connected to its associated match terminal 82 and a complementary output connected to its associated mismatch terminal 83. The reset input of the flip-flop 85 is connected through the normally-open switch 78 to the positive terminal of the battery 79; thus, the flip-flop 85 is reset upon closing the switch 78. The set input of the flip-flop 85, on the other hand, is connected to the output of a 2-input and gate 86. Interrogate pulses available from the interrogate pulse generator 28 are applied to an interrogate input terminal 87. Terminal 87 is, in turn, connected to the input of a clock pulse generator 89, the output of which is applied to one input of the 2-input and gate 86. Lastly, the sense line from the associated linear array of storage elements 50–58 or 60–68 is connected to the input of a "one-shot" multivibrator 90, the output of which is connected to the remaining input of the 2-input and gate 86.

Figure 3A:
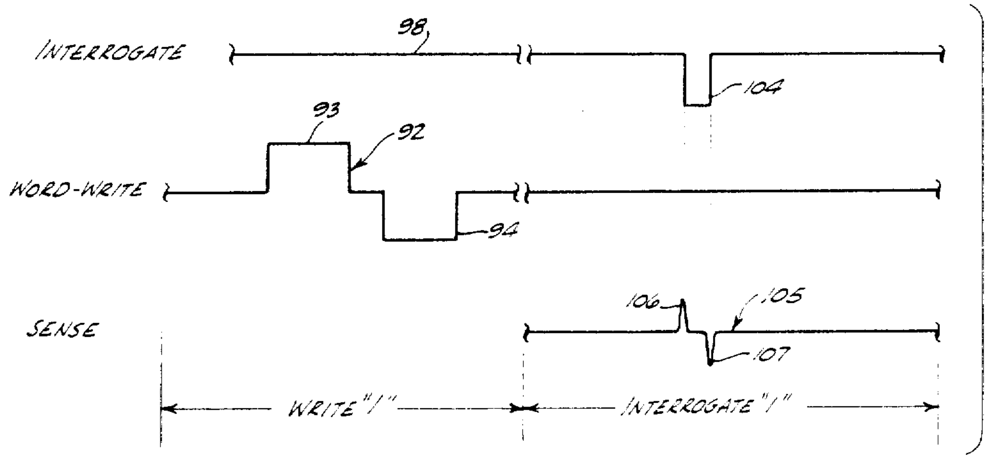
FIGS. 3A and 3B illustrate voltage waveforms on the sense, word write and interrogate lines of the biaxial storage element of FIG. 2 when writing and reading a 1 and when writing and reading a 0, respectively.

To understand more clearly the operation of the sensing apparatus of FIG. 6, it is first desirable to note the mode of operation of the biaxial storage elements 50–58, 60–68 employed in the memory array of the present invention. Referring to FIGS. 2, 3A, 3B, 4 and 5, there is illustrated the mode of operation of the biaxial storage elements 50–58 and 60–68 of the associative memory of the present invention. In particular, with regard to the write operation, waveform 92, FIG. 3A, illustrates a typical voltage waveform generated by the write-one pulse generator 32 in response to synchronizing signals applied to input terminal 33 thereof and applied to the word write lead which threads the storage holes 37 of the biaxial elements 50–58 and 60–68. Waveform 92 possesses a positive pulse 93 followed by a negative pulse 94. The actual time interval between the positive pulse 93 and negative pulse 94 is not critical and may be allowed to approach zero. In the event it is desired to write a 1 in the storage element, the voltage applied to the interrogate lead remains at the zero level as indicated by waveform 98. When interrogating the state of a biaxial storage element, an interrogate pulse 104 of the same polarity as the pulse 94 of waveform 92 but of shorter duration is generated on the interrogate lead which threads interrogate hole 36. When a binary 1 has been written into the biaxial element being interrogated, the waveform 105 with positive excursion 106 and negative excursion 107 is generated on the sense lead in response to the interrogate pulse 104 in a manner hereinafter described.

Figure 3B:
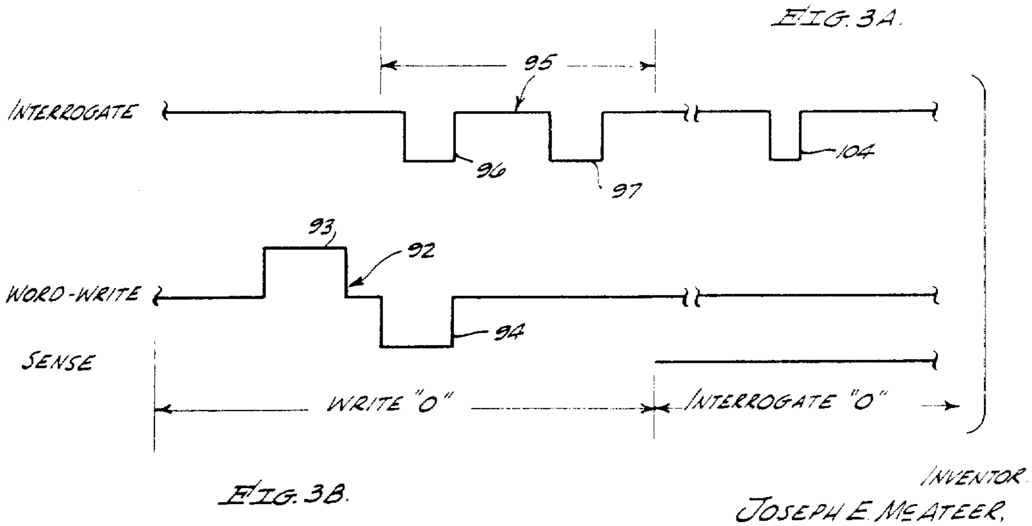

Referring to FIG. 3B, there are shown waveforms applied to a storage element when a binary 0 is written into the storage element. As before, the write-one pulse generator 32 generates the waveform 92 with the positive pulse 93 preceding the negative pulse 94. The negative pulse 94 of the voltage waveform 92 initiates operation of the write-zero pulse generator 30 to generate a voltage waveform 95 which possesses a negative pulse 96 concurrent with the negative pulse 94 of the voltage waveform 92 and a subsequent negative pulse 97 of substantially the same amplitude and duration. In the operation of a biaxial storage element, the waveform 95 is only applied to an interrogate lead by means of and gates 17–24 when it is desired to write a binary 0 into the storage element. Upon interrogating a biaxial storage element having a 0 written therein with the negative pulse 104, no signal appears on the sense lead, as indicated in FIG. 3B.

Figure 4:
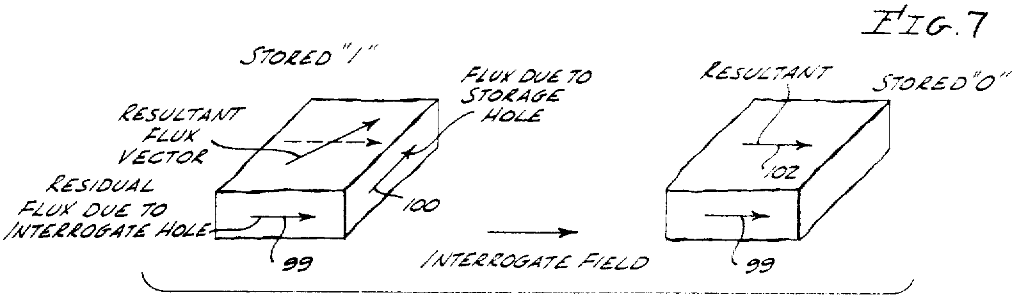
FIG. 4 illustrates the flux vectors in the common volume between the orthogonal holes of the biaxial storage element of FIG. 2 during circumstances when a 1 is stored and when a 0 is stored.
Figure 5:
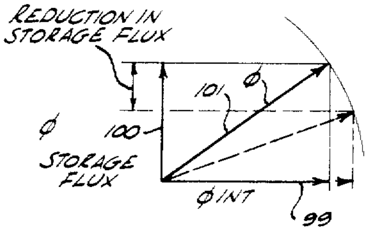
FIG. 5 shows the manner in which the storage flux vectors are combined during storage of a 1 and during storage of a 0 in the common volume between the orthogonal holes of the biaxial storage element of FIG. 2.

Referring to FIG. 4, there is shown the state of the flux in the slab of ferrite material intermediate the interrogate hole 36 and the storage hole 37 during various stages of the write operation. This slab always has flux in the direction generated by current flow through the interrogate lead represented by vector 99. During the application of the positive pulse 93 of the voltage waveform 92, a magnetomotive force having a direction normal to the word-write lead is produced thereby producing magnetic flux represented by the vector 100. Subsequently, the generation of the negative pulse 94 with no concurrent pulse from the word-write lead produces no permanent effect on the storage flux represented by vector 100. The flux represented by vectors 99 and 100 combines vectorially, as shown in FIG. 5. It is to be noted that the ferrite storage element is composed of a saturable magnetic material; hence, there can be no vector addition which exceeds the saturation point of the ferrite. Hence, the interrogation flux and the storage flux represented by vectors 99, 100, respectively, combine in a manner to produce a flux vector 101 which has a magnitude equal to the saturation level of the ferrite material. This amplitude of the flux vector 101 even though saturated determines the amplitude of the interrogate flux vector 99 and the storage flux vector 100. When it is desired to write a 1, no further changes are made in the magnitude and direction of flux vector 101. When writing a 0, however, the subsequent appearance of the large negative pulse 96 of the waveform 95 on the interrogate line concurrent with the negative pulse 94 of waveform 92 produces a radical decrease in the magnitude of the storage flux vector 100. Subsequently, the occurrence of the negative pulse 97 on the interrogate line reduces the storage flux vector 100 to substantially zero whereby the resultant flux represented by vector 102 is substantially parallel to the initial interrogate flux vector 99.

When it is desired to interrogate the state of a biaxial storage element, an interrogate pulse having the same polarity as the pulse 94 of waveform 92 and of shorter duration such as represented by waveform 104, FIGS. 3A, 3B, is generated on the interrogate lead which threads interrogate hole 36. The resulting effect of applying the interrogate pulse 104 in this manner is illustrated in FIG. 5. When a 1 is stored by the storage element being interrogated, the magnitude of the flux vector 99 is temporarily increased. Since the combined flux vector 101 is at saturation, however, this increase in the magnitude of vector 99 merely rotates the flux vector 101 towards the flux vector 99 thereby decreasing the magnitude of the storage flux vector 100. Termination of the interrogate pulse 104 allows the storage flux vector 100 to return to its former state thereby achieving nondestructive readout. The decrease and increase of the storage flux vector 100 linking the word-write and sense leads, however, induces the voltage excursions 106, 107 of waveform 105 FIG. 3A, on the sense lead threading the storage hole 37. That is, a change in the flux linkages around the sense lead first induces the positive spike 106 in response to the negative excursion of interrogate pulse 104 and subsequently induces the negative spike 107 in response to the positive excursion of the interrogate pulse 104. The polarities of waveforms 105 may, of course, be reversed by threading the storage element, for example, in the opposite direction. In the situation where a 0 is stored, however, there is no flux linking the sense lead; i.e., the storage flux is zero; hence, any change in the magnitude of the interrogate flux vector 99 cannot induce any voltage or current in the sense lead. Thus, no output is generated on the sense lead in response to an interrogate pulse 104 when a 0 is stored in the storage element, i.e., when the resultant vector 102 is parallel to the interrogate flux vector 99.

Refer again to FIG. 1 of the drawings. Prior to writing in the associative memory of the present invention, it is normally necessary to clear the action bit storage elements 58, 68 . . . of the memory. This is accomplished by changing the state of the normal connections of the switches 75, 78, thus opening the switch 75 and closing the switch 78. The opening of the switch 75 disconnects the interrogate line 48 which threads the interrogate holes 36 of the storage elements 58, 68 from the output of or gate 26 thereby assuring that no signal will be applied to this line during the clearing operation. The closing of the switch 78, on the other hand, applies the voltage provided by the battery 79 to the write-one pulse generator 77 and to the reset inputs of the sensing apparatuses 80, 81. The voltage thus applied changes the respective outputs of the sensing apparatuses 80, 81 so that in each case a voltage indication appears on the mismatch terminals 83. The write-one pulse generator 77, in response to the voltage provided by battery 79, generates a signal having the waveform 92, FIGS. 3A, 3B. This signal is applied to the word-write lead 76 which threads the storage holes 37 of the storage elements 58, 68. In that no signal is concurrently applied to the interrogate line 48, a 1 is written into each of the storage elements 58, 68. The associative memory of the present invention is now ready to receive information.

A word is written in the memory array of the present invention by first setting up the word in the search-write register 10. This is accomplished, for example, by applying a "set" pulse to the set inputs of the flip-flops corresponding to bits at the information level and by not applying any signal to the set inputs of the flip-flops corresponding to bits of the word at the zero level. This may be accomplished manually or may be achieved by the use of other conventional type registers. In the event that a binary 1 is set up in one or more of the flip-flops A, B, C or D of search-write register 10, an information-level signal appears on the principal output thereof and a zero-level signal appears on the complementary output. On the other hand, if the flip-flops A, B, C or D correspond to a binary zero, a zero-level signal appears at the principal output and an information level signal appears at the complementary output. Thus, in instances where a 0 is set up in a particular flip-flop A, B, C or D, an information-level signal is applied to the corresponding and gates 21, 22, 23 or 24, thereby allowing the output of the write-zero pulse generator 30 to be applied through the or gate 26 and through the respective and gates 21–24 whereat the outputs therefrom at the information level are applied to the interrogate leads 44–47, respectively. The principal outputs from the flip-flops A, B, C or D, on the other hand, are connected, respectively, to inputs of the and gates 17–20. When a 1 is set up in a particular flip-flop A, B, C or D, the corresponding principal outputs will be at the information level thereby "opening" the corresponding and gate 17–20 for any signal from the write-zero pulse generator 30. Thus, for circumstances where there is a 1 in the flip-flop A, B, C or D of the search-write register 10, the output signal from the write-zero pulse generator 30 is applied through the or gate 26 and the corresponding and gates 17, 18, 19 or 20 to the respective interrogate leads 40–43.

In operation, the address counter 72 generates an information-level signal on the particular lead or leads corresponding to a linear array of storage elements 50–57, 60–67, . . . , where it is desired to write the word set up in the search-write register 10. This information level signal is applied, for example, to the driver 70 thereby enabling the output of the write-one pulse generator 22 to be applied through the driver 70 to the word-write lead threading the storage holes 37 of the storage elements 50–58. The waveform 92 generated at the output of the write-one pulse generator 22 is then applied through the driver 70 to the linear array of storage elements 50–58. Considering the storage elements 54–57 wherein information corresponding to the normal state of the word set up in search-write register 10 is to be written, the and gates included in the and gates 21–24 corresponding to 1's in the search-write register 10 are "closed" and the remaining and gates corresponding to 0's are "open." Thus, the output from the write-zero pulse generator 30 is applied to only the interrogate lines 44–47 corresponding to 0's in the search-write register 10. Further, the storage elements 50–53 designed to store the complementary state of the word set up in search-write register 10 are responsive to interrogate leads 40–43, respectively, which are, in turn, connected to the output of and gates 17–20. The and gates 17–20, corresponding to 1's in the search-write register 10, are "open" and the remaining and gates corresponding to 0's remain closed. Thus, the and gates 17–20 corresponding to 1's in the search-write register 10 allow the output of the write-zero pulse generator 30 to be applied to the respective interrogate leads threading the storage elements 50–53, thereby writing 0's into each element corresponding to 1 in the search-write register 10. In that no signal is applied to the interrogate lead of the remaining storage elements which correspond to 0's in the word set up in search-write register 10, a 1 is written therein.

In addition to the above, the write-zero pulses generated by write-zero pulse generator 30 are applied through the or gate 26 and normally-closed switch 75 to the interrogate lead 48 threading the interrogate holes 36 of the action bit storage elements 58, 60, thereby writing a 0 in the storage element 58 which, in the instant case, corresponds to the linear array of storage elements 50–57 wherein the word has been written.

In the search phase of operation, the word to be searched is set up in the search-write register 10 in the same manner as though being written. The outputs of the search-write register 10 opens gates 21–24 corresponding to 0's of the word thus set up in the respective flip-flops A, B, C or D, and opens and gates 17–20 corresponding to 1's in the flip-flops A, B, C or D. Interrogate pulses generated by the interrogate pulse generator 28 are applied through the or gate 26 to all of the interrogate leads 40–47 connected to the output of and gates 17–24 which are open. Accordingly, only the 0's in the normal state and the 0's in the complementary state are interrogated. When considered together, however, interrogation of only the zeros in both the normal and the complement store constitutes an interrogation of the entire word. In addition, all of the action bits storage elements 58, 68 are interrogated in every search operation. Thus, in each case, if no word has been written in a particular linear array of storage elements 50–57 or 60–67, a 1 will remain in the corresponding action bit storage element 58, 68, . . . , and will produce the voltage waveform 105, FIG. 3A, which maintains a mismatch voltage indication at the output terminal 83 of the sensing apparatuses 80, 81. Similarly, if a word has been written in any linear array of storage elements 50–57 or 60–67 and a 1 is interrogated, a voltage waveform 105 will be generated by the storage element wherein the 1 was written. This voltage waveform 105 is applied to the respective sensing apparatuses 80 or 81 and results in an indication of a mismatch at the corresponding mismatch terminal 83.

Lastly, if all of the storage elements 50–57 of a single linear array which are interrogated have a 0 stored therein, no voltage excursions are generated. Further, at the time of writing a word in the linear array of storage elements 50–57, a 0 would have been written in the action bit storage element 58 whereby interrogation of this storage element 58 produces no voltage excursions on the sense line applied to the input of the sensing apparatus 80. When no voltage excursions are applied to the sensing apparatuses 80, 81, concurrent with the generation of an interrogation pulse by the interrogate pulse generator 28, a match is indicated at the corresponding match output terminal 82.

Figure 7:
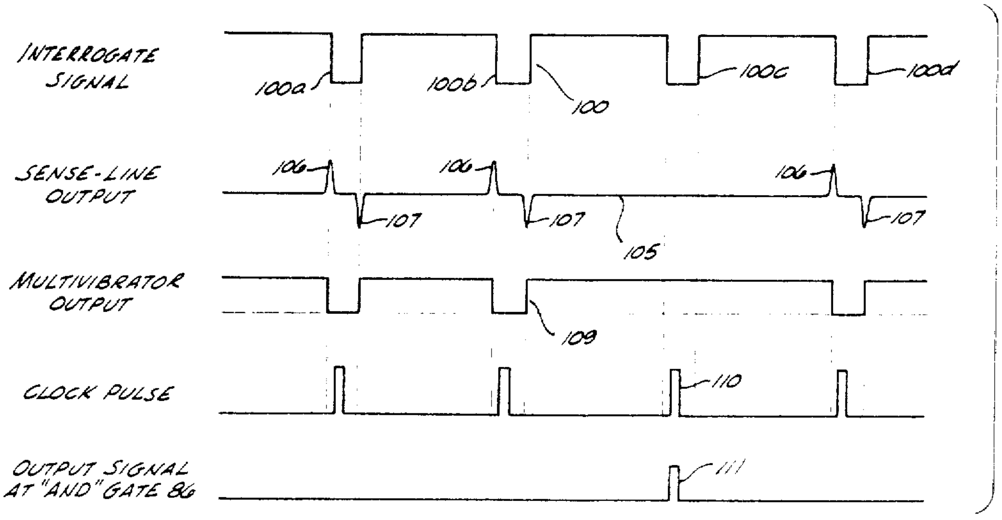
FIG. 7 illustrates voltage waveforms at various points throughout the sensing apparatus of FIG. 6.

A manner in which this match indication may be achieved at the match output terminal 82 is shown by way of example by the waveforms of FIG. 7, which illustrate the operation of the sensing apparatus of FIG. 6. In particular, the interrogate signal is shown as a waveform 100 which shows a series of negative pulses 100*a*, 100*b*, 100*c* and 100*d*. As explained in connection with the operation of the single biaxial storage element shown in FIG. 2, the voltage excursions 106, 107, FIG. 3A, are generated only in response to the interrogation pulses of waveform 100 and only when there are 1's stored in the storage elements of the linear array of storage elements 50–58 or 60–68 which are interrogated. In the present example illustrated in FIG. 7, each interrogation pulse of the waveform 100 may correspond to a search for a different word. In the particular example illustrated in FIG. 7, a match is indicated corresponding to interrogation pulse 100*c*; i.e., interrogation pulse 100*c* did not produce the voltage excursions 106–107 of the waveform 105 on the sense output in response to interrogation pulse 100*c* as in the remaining cases.

Referring to FIG. 6, the signals represented by waveform 105 generated on the sense line are applied to the one-shot vibrator 90 to generate a waveform 109 which is normally at information level and which recedes to zero level between each set of the voltage excursions 106 and 107. Thus, under circumstances where there is in fact a match, the voltage waveform 109 remains at information level. Lastly, the interrogate pulses available at input terminal 87 are applied to the clock pulse generator 89 to generate a waveform 110 which constitutes a series of clock pulses, each of which preferably occurs in the center portion of the corresponding interrogate pulse.

The output of multivibrator 90 represented by waveform 109 and the output of clock pulse generator 89 represented by wave form 110 are applied to the two inputs of and gate 86. Both of the waveforms 109, 110 are at information level only during the clock pulse of waveform 110 corresponding to the interrogate signal 100*c*. Thus, a pulse 111 appears at the output of and gate 86 only during the occurrence of the clock pulse corresponding to interrogate pulse 100*c*. This pulse 111 is applied to the set input of the flip-flop 85 thereby to change the voltage levels at the outputs thereof to indicate a match. This indication remains until the sensing apparatuses 80, 81, . . . , are reset prior to searching an additional word.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An associative memory apparatus having an improved mode of operation, said apparatus comprising a plurality of storage elements, each of said storage elements constituting a bar of ferrite material having interrogate and storage holes disposed therethrough, said interrogate hole being orthogonal to and spaced from said storage hole; means including an interrogate conductor disposed through said interrogate holes through said bars of ferrite material for producing a residual magnetic flux in a first direction transverse to the longitudinal axis of said interrogate holes in the portion of said bars intermediate said respective interrogate and storage holes thereof; means including a word-write electrical conductor disposed through said storage holes through said bars of ferrite material for producing a magnetic flux in a second direction transverse to the longitudinal axis of said storage holes thereby to produce a resultant saturated magnetic flux making an acute angle with said first direction in said portion of said bars intermediate said respective interrogate and storage holes whereby a binary 1 is stored in said storage elements; means connected to said word-write electrical conductor and selectively connected to said interrogate conductor for simultaneously producing magnetomotive forces in said first direction and in a direction opposite to said second direction thereby to selectively rotate said resultant saturated magnetic flux substantially back to said first direction thereby to convert said binary 1 in said selected storage elements to a binary 0, and means coupled to said interrogate conductor and including a sense conductor disposed through said storage holes for producing a magnetomotive force in said first direction in said portion of said bar thereby to generate an electrical indication on said sense conductor in response to a binary 1 stored in said respective storage element and to generate no electrical indication on said sense conductor in response to a binary 0 stored in said storage element.

2. The associative memory apparatus as defined in claim 1 including additional means coupled to said interrogate conductor for producing additional magnetomotive force in said first direction subsequent to said simultaneously produced magnetomotive forces thereby to align more accurately said resultant magnetic flux in said first direction.

3. An associative memory apparatus adapted to store words of a predetermined number of bits, said apparatus comprising:

(a) a plurality of linear arrays having first and second groups, each group having a number of storage elements equal to said predetermined number, each of said storage elements comprising a bar of ferrite material having first and second holes disposed therethrough with said first hole orthogonal to and spaced from said second hole and having a residual magnetic flux in a first direction transverse to the longitudinal axis of said first hole in the portion of said bar of said respective storage elements intermediate said first and second holes;

(b) means including a register for providing a principal and a complementary output for each bit of a first word having no more than said predetermined number of bits;

(c) means including a corresponding plurality of electrical conductors threaded through the respective second holes of said storage elements of each of said plurality of linear arrays for producing a magnetic flux in a second direction transverse to the longitudinal axis of said second hole thereby to produce a resultant magnetic flux making an acute angle in a plane parallel to the longitudinal axes of said first and second holes with said first direction thereby to write a binary 1 in each of the storage elements of a selected linear array;

(d) means responsive to said complementary outputs of said register and including a first set of electrical conductors threaded through respective first holes of said storage elements of said first group thereof for simultaneously producing magnetomotive forces in said first direction and in a direction opposite to said second direction thereby to selectively rotate said resultant magnetic flux substantially back to said first direction thereby to convert said binary 1 in the storage elements of said first group corresponding to a 0 of said first word in said register to binary 0; and (e) means responsive to said principal outputs of said register and including a second set of electrical conductors threaded through respective first holes of said storage elements of said second group thereof for simultaneously producing magnetomotive forces in said first direction and in a direction opposite to said second direction thereby to selectively rotate said resultant magnetic flux substantially back to said first direction thereby to convert said binary 1 in the storage elements of said second group corresponding to a 1 of said first word in said register to a binary 0.

4. The associative memory apparatus as defined in claim 3 additionally including an action bit storage element corresponding to each linear array, each action bit storage element comprising a bar of ferrite material having first and second holes disposed therethrough with said first hole orthogonal to and spaced from said second hole, said respective second holes being threaded by said corresponding plurality of electrical conductors and said elements having a residual magnetic flux in a first direction transverse to the longitudinal axis of said first hole in the portion of said bar of said respective storage elements intermediate said first and second holes; means including an electrical conductor threading all the second holes of said action bit storage elements for producing a magnetic flux in a second direction transverse to the longitudinal axis of said second hole thereby to produce a resultant magnetic flux making an acute angle in a plane parallel to the longitudinal axes of said first and second holes with said first direction thereby to store a binary 1 in each of said action bit storage elements; means including an interrogate lead threading said first holes of said action bit storage elements for simultaneously producing magnetomotive forces in said first direction and in a direction opposite to said second direction to rotate said resultant magnetic flux substantially back to said first direction to convert said first binary 1 to a binary 0 in an action bit storage element corresponding to a linear array thereof concurrently with said simultaneously produced magnetomotive forces in selected storage elements of said linear array; means coupled to said first and second sets of electrical conductors and to said interrogate lead threading said first hole of said action bit storage elements for interrogating conductors of said first set corresponding to binary 0's of a second word in said register and for interrogating conductors of said second set corresponding to binary 1's of said second word; and means including a sensing conductor threading all second holes of said storage elements of each linear array and said second hole of each corresponding action bit storage element for indicating voltage indications in response to each interrogation whereby no voltage indication is generated from a linear array wherein a word matching said second word has been written and the action bit storage element corresponding thereto.

References Cited by the Examiner

UNITED STATES PATENTS

| | | | |
|---|---|---|---|
| 3,031,650 | 4/1962 | Koerner | 340—174 |
| 3,189,879 | 6/1965 | MacIntyre | 340—174 |
| 3,195,109 | 7/1965 | Behnke | 340—172.5 |

ROBERT C. BAILEY, *Primary Examiner.*

R. B. ZACHE, *Assistant Examiner.*